Patented Oct. 24, 1939

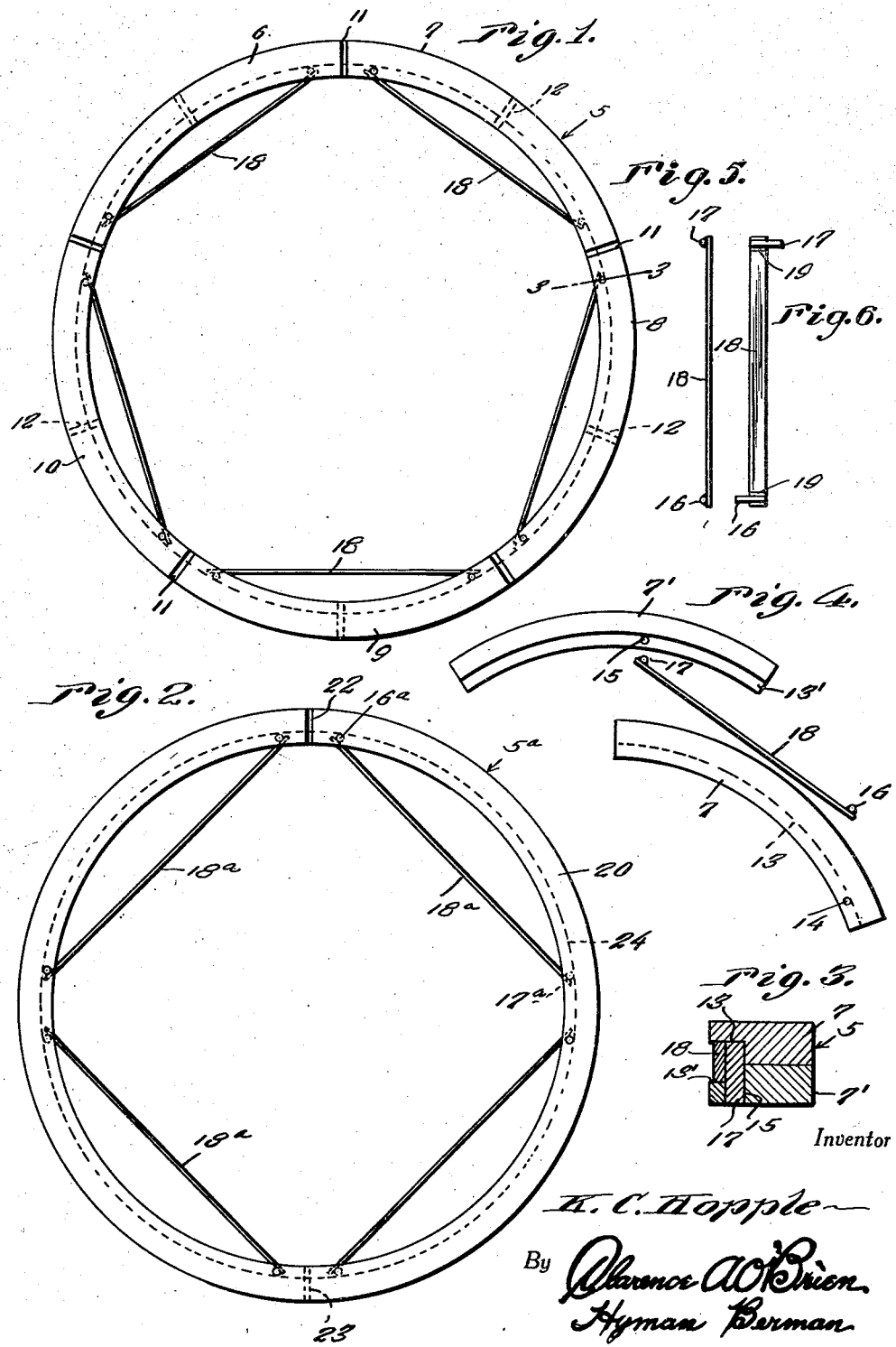

2,177,110

UNITED STATES PATENT OFFICE 2,177,110

PISTON RING

Kenneth C. Hopple, Atchison, Kans.

Application February 8, 1937, Serial No. 124,767

9 Claims. (Cl. 309—41)

My invention relates generally to compression rings for pistons, and particularly to piston rings composed of overlapping superposed segments, in combination with inner springs, and an important object of my invention is to provide efficient and long lived piston rings of this character, which prevent the development of piston slap and other faults of piston operation in cylinders.

Other important objects of my invention will be apparent from a reading of the following description in connection with the drawing, wherein for purposes of illustration I have shown preferred embodiments of my invention.

In the drawing:

Figure 1 is a general plan view of an embodiment of the invention composed of a plurality of overlapping superposed segments.

Figure 2 is a plan view of another embodiment of the invention in a piston ring composed of two overlapping and superposed circles.

Figure 3 is a transverse vertical sectional view taken through Figure 1 approximately on the line 3—3.

Figure 4 is a group view in top plan of two of the related segments of the embodiment shown in Figure 1 of the drawing, showing the relation of the corresponding spring thereto.

Figure 5 shows an edge view of one of the springs and

Figure 6 shows a side view thereof.

Referring in detail to the drawing, and particularly to Figures 1, 3, 4 and 5, the numeral 5 generally designates the piston ring which in this instance is composed of two circles composed of five segments 6, 7, 8, 9, and 10 in the case of the upper circle, and 6', 7', 8', 9' and 10', in the case of the circle on which the upper circle is shown as superposed in the drawing.

As indicated the corresponding segments are superposed and their ends overlap half-way so that the gaps 11 between the segments of the upper circle are full-way displaced from the gaps 12 of the segments of the lower circle.

The upper segments have the bottom thereof at the radially inward side thereof the groove 13 which matches a similar groove 13' in the upper radially inward edge of the lower segment 7' as illustrated in Figure 3, and these grooves extend the full length of the segments in the particular embodiments of the invention shown herein.

At points close to the opposite ends of the segments, and alternating between the upper and lower related segments are dowel pin holes 14, 15 which receive the corresponding dowel pins 16, 17 which extend on opposite edges of the flat elongated inner spring 18 which thereby has an end portion disposed in the slot defined by the two grooves 13 and 13', as indicated in Figure 3 of the drawing.

The dowel pins 16, 17 are preferably welded as indicated by the numeral 19 to one and the same side of the flat spring 18. The springs 18 are of a length to extend substantially straight between the points of engagement with the upper and lower related segments of the ring as indicated in Figure 1, but when the ring is in position in a cylinder and in operative relation thereto, the gaps between the segments will be somewhat contracted so that the springs will bow in a radially inward direction.

In the embodiment of the invention shown in Figure 2, a single upper circle composed of a circular broken ring 20 and a lower broken ring 21 are superposed with the gaps 22 and 23, respectively, in diametrically opposed positions. These circles 20 and 21 are each equipped with suitable dowel pin receiving holes to accommodate four springs 18'. Two adjacent springs engage the rings or circles closely adjacent opposite sides of the gap 22, while two opposed springs engage the circles closely adjacent the opposite sides of the gap 23. The remaining ends of the corresponding spring engage intermediate points between these gaps as clearly illustrated in Figure 2 of the drawing. The arrangement of engagement of the springs with the upper and lower circles and the action of the springs 18' is the same in the embodiment of the invention which is shown in Figure 2, as it is in the first described embodiment of my invention.

Although I have shown and described herein preferred embodiments of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:

1. A piston ring of the character described comprising a circle composed of a first discontinuous element, a second discontinuous element upon which the first element is superposed, the continuous portions of the two elements being overlapped on the discontinuous portions thereof, and spring means operatively connected between overlapped portions of the said elements, means connecting the opposite ends of said spring means respectively to the first and second discontinuous elements.

2. A piston ring of the character described comprising a circle composed of a first discontinuous element, a second discontinuous element upon which the first element is superposed, the continuous portions of the two elements being overlapped on the discontinuous portions thereof, and spring means operatively connected between overlapped portions of the said elements, said spring means comprising a chordally arranged spring provided at its opposite ends with oppositely directed dowels, engaged respectively with the first and second discontinuous elements.

3. A piston ring of the character described comprising a circle composed of a first discontinuous element, a second discontinuous element upon which the first element is superposed, the continuous portions of the two elements being overlapped on the discontinuous portions thereof, and spring means operatively connected between overlapped portions of the said elements, said spring means comprising a chordally arranged spring provided at its opposite ends with oppositely directed dowels, said oppositely directed dowels being engaged respectively with accommodating openings formed in the said first and second discontinuous elements.

4. A piston ring of the character described comprising a circle composed of a first discontinuous element, a second discontinuous element upon which the first element is superposed, the radially inward faces of these elements being formed with a complementary indentation, the two indentations defining a groove, the continuous portions of the two elements being overlapped on the discontinuous portions thereof, and spring means operatively connected between overlapped portions of the said elements, said spring means comprising a chordally arranged spring provided at its opposite ends with oppositely directed dowels, said opposite ends of the spring being arranged to seat in the said groove with the dowels projecting into openings formed in opposite walls of said groove.

5. A piston ring of the character described composed of a first element formed of a plurality of segments having gaps therebetween, a second element on which the first element is superposed, said second element being formed of a plurality of segments having gaps therebetween, the gaps of the said elements being located intermediate the ends of the segments, and chordally arranged springs, each spring having an end thereof located between overhanging radially inward parts of overlapped segments adjacent a gap in one of the related segments, and means securing the said end of the spring in place.

6. A piston ring of the character described composed of a first element formed of a plurality of segments having gaps therebetween, a second element on which the first element is superposed, said second element being formed of a plurality of segments having gaps therebetween, the gaps of the said elements being located intermediate the ends of segments and chordally arranged springs, each spring having an end thereof located between overhanging radially inward parts of overlapped segments adjacent a gap in one of the related segments, and means securing the said end of the spring in place, said overhanging parts being defined by complementary indentations in the meeting portions of overlapped segments.

7. A piston ring comprising a pair of superposed transversely split annular members, the split portions of the respective members being overlapped by continuous portions of the others of the members, and spring strips having their opposite ends connected respectively to overlying and underlying annular members.

8. A piston ring comprising a pair of superposed transversely split annular members, the split portions of the respective members being overlapped by the continuous portions of the other of the members, said members having openings therein and spring strips having dowels at each end inserted in the openings of the respective members.

9. A piston ring comprising a pair of superposed transversely split annular members, the split portions of the respective members being overlapped by the continuous portions of the other of the members, said members having flanges on their inner peripheries defining an annular groove, said flanges having openings therein, spring strips having their ends positioned in said groove and oppositely extending dowels on the ends of the strips inserted in the openings of the respective members.

KENNETH C. HOPPLE.